(12) United States Patent
Fan et al.

(10) Patent No.: US 12,481,911 B2
(45) Date of Patent: Nov. 25, 2025

(54) LOYALTY EXTRACTION MACHINE

(71) Applicant: Ko-Hui Michael Fan, Taipei (TW)

(72) Inventors: Ko-Hui Michael Fan, Taipei (TW); Chih-Chung Chang, Taipei (TW); Kuang-Hsiao-Yin Kongguoluo, Taipei (TW)

(73) Assignee: Ko-Hui Michael Fan, Taipei (TW)

( * ) Notice: Subject to any disclaimer, the term of this patent is extended or adjusted under 35 U.S.C. 154(b) by 1261 days.

(21) Appl. No.: 17/230,283

(22) Filed: Apr. 14, 2021

(65) Prior Publication Data

US 2022/0343204 A1 Oct. 27, 2022

(51) Int. Cl.
| | |
|---|---|
| *G06N 20/00* | (2019.01) |
| *G06F 7/32* | (2006.01) |
| *G06F 17/16* | (2006.01) |
| *G06N 7/00* | (2023.01) |
| *G06N 20/20* | (2019.01) |

(52) U.S. Cl.
CPC ............... *G06N 20/00* (2019.01); *G06F 7/32* (2013.01); *G06F 17/16* (2013.01); *G06N 7/00* (2013.01); *G06N 20/20* (2019.01)

(58) Field of Classification Search
CPC .......... G06N 20/00; G06N 7/00; G06N 20/20; G06F 7/32; G06F 17/16
See application file for complete search history.

(56) References Cited

U.S. PATENT DOCUMENTS

| | | | |
|---|---|---|---|
| 10,142,403 B1 * | 11/2018 | Prieditis | G06F 17/10 |
| 11,610,679 B1 * | 3/2023 | Zhan | G06N 3/096 |
| 2008/0287308 A1 * | 11/2008 | Hubbell | G16B 40/30 |
| | | | 506/8 |
| 2015/0023214 A1 * | 1/2015 | Soneda | H04L 41/12 |
| | | | 370/254 |
| 2016/0292592 A1 * | 10/2016 | Patthak | G06F 3/04842 |
| 2018/0373991 A1 * | 12/2018 | Rosenberg | G06N 5/041 |
| 2019/0325319 A1 * | 10/2019 | Antonio | G06N 20/00 |

(Continued)

OTHER PUBLICATIONS

B. Zhang and Z. Zhu, "Linearized proximal alternating direction method of multipliers for parallel magnetic resonance imaging," in IEEE/CAA Journal of Automatica Sinica, vol. 4, No. 4, pp. 763-769, 2017, doi: 10.1109/JAS.2016.7510226. (Year: 2017).*

(Continued)

*Primary Examiner* — James D. Rutten
(74) *Attorney, Agent, or Firm* — MUNCY, GEISSLER, OLDS & LOWE, P.C.

(57) ABSTRACT

The present invention provides a loyalty extraction machine, wherein "quadratic multiform separation" (QMS) is modified and executed multiplicatively in an even generalized way. In each execution, the characteristic of one single membership is either enhanced or reduced. This process is performed in turn to each membership. Thus, every sample data (or element) receives multiple classification results. Then, the multiple classification results are collected and analyzed by an "eclectic classifier" to reach a final decision. The combination of the generalized QMS and the eclectic classifier therefore develops the loyalty extraction machine. Moreover, a label called "loyalty type" of the element is introduced to describe the effectiveness of membership recognition with respect to a training set.

17 Claims, 4 Drawing Sheets

(56) References Cited

U.S. PATENT DOCUMENTS

| | | | |
|---|---|---|---|
| 2019/0333205 A1* | 10/2019 | Fang | G05B 19/406 |
| 2021/0182689 A1* | 6/2021 | Teig | G06N 3/084 |
| 2022/0301296 A1* | 9/2022 | Babagholami Mohamadabadi | G06N 3/09 |

OTHER PUBLICATIONS

Huang et al., "BERT-Based Multi-Head Selection for Joint Entity-Relation Extraction", 2019, arXiv.org, <arxiv.org/abs/1908.05908> (Year: 2019).*

Y. Ro and J. Y. Choi, "Heterogeneous Double-Head Ensemble for Deep Metric Learning," in IEEE Access, vol. 8, pp. 118525-118533, 2020, doi: 10.1109/ACCESS.2020.3004579 (Year: 2020).*

* cited by examiner (Classifiers working individually)

or or

LOYALTY EXTRACTION MACHINE

BACKGROUND OF THE INVENTION

1. Field of the Invention

The present invention relates to machine learning of artificial intelligence (AI) and, more particularly, to a loyalty extraction machine derived by combination of multiform separation (MS) and an eclectic classifier.

2. Description of Related Art

As is well known, machine learning builds a hypothetical model based on sample data for a computer to make a prediction or a decision. The hypothetical model may be implemented as a classifier, which approximates a mapping function from input variables to output variables. The goal of machine learning is to make the hypothetical model as close as possible to a target function which always gives correct answers. This goal may be achieved by training the hypothetical model with more sample data.

Machine learning approaches are commonly divided into three categories: supervised learning, unsupervised learning, and reinforcement learning. Various models have been developed for machine learning, such as convolutional neural network (CNN), recurrent neural network (RNN), long short-term memory (LSTM) network, YOLO, ResNet, ResNet-18, ResNet-34, Vgg16, GoogleNet, Lenet, MobileNet, decision trees, and support vector machine (SVM).

However, in the traditional approach, a classifier is applied with only a single model. As shown in FIG. 1, separate classifiers $\hat{y}_1, \hat{y}_2, \ldots, \hat{y}_k$ produce their own outputs with respect to the same input x. While, every model has its own advantages and drawbacks, in terms of accuracy, robustness, complexity, speed, dependency, cost, and so on; when a model focuses on some points, it may possibly neglect the others, and therefore an extreme bias may occur.

Moreover, the single model of the classifier has one single inference function to accomplish the job of classification. It may solve a simple classification problem as shown in FIG. 2.

However, in some cases, it is very difficult and even impossible to use one single inference function to distinguish the characteristics among elements, and put the elements into different classes. FIG. 3 shows a more complicated problem. When Class_A and Class_B have a checkerboard pattern, one single inference function can hardly fit the boundaries of the pattern, and a proper classification is unlikely to be done.

Therefore, it is desirable to provide an improved classifier to mitigate and/or obviate the aforementioned problems.

SUMMARY OF THE INVENTION

To solve the classification problem in the field of machine learning of AI, the same applicant has proposed a method called the multiform separation (MS), especially the quadratic multiform separation (QMS), which can be used to deal with the problem mentioned with reference to FIG. 3.

The same applicant has also proposed the eclectic classifier, which can be used to deal with the problem mentioned with reference to FIG. 1.

Now, the QMS is modified and executed multiplicatively in an even generalized way according to the present invention. In each execution, the characteristic of one single membership is either enhanced or reduced. This process is performed in turn to each membership. Thus, every sample data (or element) receives multiple classification results. Then, the multiple classification results are collected and analyzed by the eclectic classifier to reach a final decision. The combination of the generalized QMS and the eclectic classifier therefore develops a new and efficient classification machine. This is regarded as the first aspect of this present invention.

Moreover, along the first aspect of this present invention, a label of the element which is called "loyalty type" can be naturally introduced. The loyalty type heuristically describes the effectiveness of membership recognition with respect to a training set. This is regarded as the second aspect of this present invention.

Therefore, the present invention provides a "loyalty extraction machine". Before implementing the main steps of the loyalty extraction machine of the present invention, several preliminary steps should be performed in advance.
(Preliminary Step P1: Preparing a Training Set)

Let $\Omega \subset \mathbb{R}^p$ be a collection of data (or observations) which is composed of m memberships (or categories) of elements, and the m memberships are digitized as 1, 2, ..., m.

A part of data $\Omega_{tr} \subset \Omega$, typically called a "training set", and another part of data $\Omega_{tt} \subset \Omega$, typically called a "test set", are prepared from the data $\Omega$. The collection of data $\Omega$ may optionally include more parts, such as a remaining set $\Omega_{th}$. It is assumed that the training set $\Omega_{tr}$ and the test set $\Omega_{tt}$ are sufficiently large and share the full characteristics represented by the whole collection of data $\Omega$.
(Preliminary Step P2: Setting a Membership Function)

Let $y: \Omega \to S = \{1, 2, \ldots, m\}$ be a membership function (also regarded as a target function) so that $y(x)$ gives precisely the genuine membership of x.
(Preliminary Step P3: Training a Classifier Using the Classification Algorithm of the Present Invention)

The goal of the classification problem is to use the training set $\Omega_{tr}$ to derive a classifier $\hat{y}(\bullet)$ that serves as a good approximation of $y(\bullet)$. As will be discussed later, in the loyalty extraction machine of the present invention, 2m classifiers $\hat{y}^{\beta,1}, \ldots, \hat{y}^{\beta,m}, \hat{y}^{\gamma,1}, \ldots, \hat{y}^{\gamma,m}$ will be trained, and they will be combined to form a final classifier $\tilde{y}$.
(Preliminary Step P4: Decomposing the Training Set into Subsets)

Clearly, $y(\bullet)$ and $\hat{y}(\bullet)$ produce two decompositions of the training set $\Omega_{tr}$ as disjoint unions of subsets:

$$\Omega_{tr} = \bigcup_{j=1}^{m} \Omega_{tr}(j) = \bigcup_{j=1}^{m} \hat{\Omega}_{tr}(j)$$

where, for $j=1, \ldots, m$, $$\Omega_{tr}(j) = \{x \in \Omega_{tr} : y(x) = j\}$$

which is the genuine classification of the elements, and $$\hat{\Omega}_{tr}(j) = \{x \in \Omega_{tr} : \hat{y}(x) = j\}$$

which is the approximate classification of the elements.

Define the cardinalities $n_{tr} = |\Omega_{tr}|$ and $n_{tr}(j) = |\Omega_{tr}(j)|$, where, for a finite set A, the cardinality $|A|$ is the number of elements of A. Since the subsets $\Omega_{tr}(j)$'s are disjoint and the union of them is the training set $\Omega_{tr}$, it is obvious that $n_{tr} = \sum_{j=1}^{m} n_{tr}(j)$.

(Preliminary Step P5: Preparing a Test Set)

In some embodiments, the test set $\Omega_{tt}$ is used to determine the accuracy of $\hat{y}$, where the accuracy may refer to the percentage (%) of x's in $\Omega_{tt}$ such that $\hat{y}(x)=y(x)$, for example.

(General Multiform Separation without Weights)

Instead of finding one single inference function to accomplish the job of classification as commonly seen in many prior art methods, the present invention finds that an appropriate utilization of multiple functions can produce better solutions, in terms of accuracy, robustness, complexity, speed, dependency, cost, and so on.

In some cases, it is very difficult and even impossible to use one single inference function to distinguish the characteristics among elements with different memberships. Along this reasoning, the present invention is lead to the utilization of multiform separation.

(Main Step Q1: Generating Piecewise Continuous Functions)

Loosely speaking, a function $h: \mathbb{R}^p \to \mathbb{R}$ is called a piecewise continuous function if there exist finite disjoint subsets $D_1, \ldots, D_w$ such that $D_1 \cup \cup D_w = \mathbb{R}^p$ and h is continuous on the interior of $D_j$, $j=1, \ldots, w$.

Generate m piecewise continuous functions $f_j: \mathbb{R}^p \to \mathbb{R}$, $j=1, \ldots, m$, based on the training set $\Omega_{tr}$. After a training process, the m piecewise continuous functions $f_1, \ldots, f_m$ can carry important characteristics of respective training subsets $\Omega_{tr}(j)$'s so that each membership subset $$U(j)=\{x \in \Omega: f_j(x)=\min\{f_1(x), f_2(x), \ldots, f_m(x)\}\}$$

is expected to satisfy $U(j) \cap \Omega_{tr} \approx \Omega_{tr}(j)$ for each $j=1, \ldots, m$.

Herein, the operator min{ } indicates the minimal item of the set. In other embodiments, it is also possible to choose other operators, such as max{ }, which indicates the maximal item of the set, for the aforementioned equation to realize the present invention.

(Main Step Q2: Giving a Classifier by Multiform Separation)

The multiform separation now gives a classifier $\hat{y}: \Omega \to S$ defined by $\hat{y}(x)=j$ if $x \in U(j)$ or equivalently, $\hat{y}(x)=j$ if $f_j(x) \leq f_k(x), k=1, \ldots, m$.

In other words, an element $x \in \Omega$ is classified by the classifier $\hat{y}$ to have a membership j if the evaluation at x of $f_j$ is minimal among all the evaluations at x of the m piecewise continuous functions $f_1, \ldots, f_m$.

It is noted that, though the membership subsets U(j)'s are not necessarily disjoint, the cases that the same minimum are attained by multiple piecewise continuous functions $f_j$'s are rare. (The outputs of $f_j(x)$'s are real numbers, so it is rare that some of $f_j$'s output the same value.) However, when the case happens, a possible solution is to randomly pick one membership from the involved $f_j(x)$'s.

Hereby, a general MS classifier $\hat{y}$ of the present invention is provided.

(Quadratic Multiform Separation with Weights)

The quadratic multiform separation with weights is an improved embodiment of the aforementioned general multiform separation without weights.

Needless to say, the way to generate the piecewise continuous functions $f_j(\bullet)$'s in the multiform separation is not unique. Any suitable function may be used therein, such as a linear function, a quadratic function, a quartic function, a polynomial function, a rational function, an algebraic function, a transcendental function, or any other explicitly or implicitly defined suitable function.

However, the piecewise continuous functions $f_j(\bullet)$'s must be generated carefully in order to dig out (or extract) the characteristics hidden in each training subset $\Omega_{tr}(j)$, $j=1, \ldots, m$. According to the present invention, the quadratic multiform separation with weights is one efficient way to generate the piecewise continuous functions $f_j(\bullet)$'s which carry rich and useful information of the training subsets $\Omega_{tr}(j)$'s that can be applied in various applications in addition to solving supervised classification problem.

(Sub-Step Q11: Defining Forms of Member Functions)

Let q be a positive integer, that is, $q \in \mathbb{N}$. A function $f: \mathbb{N}^p \to \mathbb{R}$ is called a q-dimensional member function if it is of the form $$f(x)=\|Ax-b\|^2$$

for a constant matrix $A \in \mathbb{N}^{q \times p}$ and a constant vector $b \in \mathbb{N}^q$, where $\|\bullet\|$ denotes the Euclidean norm. Clearly, f(x) is a quadratic function of x. When we say "solve f", it means "find the constant matrix A and the constant vector b". Accordingly, the constant matrices $A_1, \ldots, A_m$ and the constant vectors $b_1, \ldots, b_m$ of the m q-dimensional member functions $f_1(x), \ldots, f_m(x)$ are items to be solved, as will be discussed later in sub-steps Q132 to Q137. A minimizing member function is also known as a minimizer.

(Sub-Step Q12: Creating a Set of Member Functions)

Let $\Theta(q)$ denote the set of all q-dimensional member functions:

$$\Theta(q)=\{\|Ax-b\|^2: A \in \mathbb{N}^{q \times p}, b \in \mathbb{N}^q\}$$

The member functions may be regarded as data structures.

(Sub-Step Q13: Generating Member Functions)

As will be discussed later, the present invention requires 2m developed classifiers $\hat{y}^{\beta,1}(x), \ldots, \hat{y}^{\beta,m}(x), \hat{y}^{\gamma,1}(x), \ldots, \hat{y}^{\gamma,m}(x)$. For example, m minimizers $f_1^{\beta,1}, \ldots, f_m^{\beta,1}$ will be generated after a training process, and the m minimizers $f_1^{\beta,1}, \ldots, f_m^{\beta,1}$ will then be used to develop the classifier $\hat{y}^{\beta,1}$. Accordingly, there will be 2 $m^2$ minimizers $f_1^{\beta,1}, \ldots, f_m^{\beta,1}, \ldots, f_1^{\beta,m}, \ldots, f_m^{\beta,m}, f_1^{\gamma,1}, \ldots, f_m^{\gamma,1}, \ldots, f_1^{\gamma,m}, \ldots, f_m^{\gamma,m}$ used to develop the 2m classifiers.

The present invention provides an efficient training process for generating the minimizers, and the sub-step Q13 can be divided into the following detail-steps Q131 to Q137.

(Detail-Step Q131: Setting Control Parameters of Training Process)

Let $\alpha_{jk} \in (0,1)$, $j=1, \ldots, m$, $k=1, \ldots, m$ be control parameters of the training process. The $m^2$ control parameters $\alpha_{jk}$, $j=1, \ldots, m$, $k=1, \ldots, m$ are not necessarily distinct.

(Detail-Step Q132: Defining Intermediate Functions of Training Process)

Let $f_1, \ldots, f_m$ be m q-dimensional member functions. Then $\mathbb{R}$ intermediate functions $\varphi_{jk}: \Omega \to \mathbb{R}$, $j=1, \ldots, m$, $k=1, \ldots, m$, are defined by $$\varphi_{jk}(x) = \max\left\{\alpha_{jk}, \frac{f_j(x)}{f_k(x)}\right\}.$$

Obviously, $\varphi_{jk}(x) < 1$ if and only if $f_j(x) < f_k(x)$, $j=1, \ldots, m$, $k=1, \ldots, m$, $k \neq j$.

The training process will be more efficient with the introduction of the aforementioned control parameters.

(Detail-Step Q133: Defining a Cost of Training Process)

The goal of the training process according to the present invention is to match the property "x has membership j" for $j=1, \ldots, m$, with the algebraic relations $\varphi_{jk}(x)<1$, $k\in S$, $k\neq j$.

For $j\in S$, define $$c(j) = c(j; f_1, \ldots, f_m) = \sum_{x\in \Omega_{tr}(j)} \sum_{k\in S, k\neq j} \varphi_{jk}(x)$$

where c(j) represents the cost contributed by $\Omega_{tr}(j)$, $j\in S$.

Before introducing the present invention, the same applicant has proposed a training process to solve $f_1, \ldots, f_m$ among $\Theta(q)$ that minimize the total cost $$\Phi = c(1)+c(2)+\ldots+c(m),$$

which is equally weighted with weight 1.

However, according to the present invention, sums with weights on different c(j)'s, $j\in S$, are employed. Such operation makes it possible to enhance or reduce the effect caused by one membership or another on the training process.

(Detail-Step Q134: Constructing Weighted Cost Functions with a Lighter Weight $\beta\in(0,1)$)

Now we explain the case of membership 1 carefully. In this case, a lighter weight $\beta$ is applied to c(1). The rest cases can be carried out similarly and therefore will be skipped. In those cases, the lighter weight $\beta$ is applied alternatively to c(2), . . . , c(m).

Fix a suitable constant $\beta\in(0,1)$, that is, $0<\beta<1$, to be a lighter weight and construct a weighted cost function in which the lighter weight $\beta$ is placed on the cost contributed by $\Omega_{tr}(1)$, that is, $$\beta\cdot c(1)+c(2)+\ldots+c(m)=\Phi^{\beta,1}(f_1, \ldots, f_m).$$

The quantity of the weighted cost function $\Phi^{\beta,1}$ provides a performance measure for separating the training subsets $\Omega_{tr}(1), \ldots, \Omega_{tr}(m)$, by the given member functions $f_1, \ldots, f_m$, while the influence by the elements of membership 1 is weakened by a lighter weight $\beta\in(0,1)$.

With the integer q, the $m^2$ control parameters $\alpha_{jk}$, $j=1, \ldots, m$, $k=1, \ldots, m$, the lighter weight $\beta$, and the training set $\Omega_{tr}$ given, and q sufficiently large, the weighted cost function $\Phi^{\beta,1}$ defined above therefore depends only on the constant matrices $A_1, \ldots, A_m$ and the constant vectors $b_1, \ldots, b_m$ that define the member functions $f_1, \ldots, f_m$.

(Detail-Step Q135: Executing Training Process Based on the Weighted Cost Functions with the Lighter Weight $\beta$)

Study the problem $$\min_{f_1, \ldots, f_m\in\Theta(q)} \Phi^{\beta,1}(f_1, \ldots, f_m) = \min_{f_1, \ldots, f_m\in\Theta(q)} \left\{\beta\cdot c(1; f_1, \ldots, f_m) + \sum_{k=2}^{m} c(k; f_1, \ldots, f_m)\right\}$$

and denote the minimizers $f_1^{\beta,1}, \ldots, f_m^{\beta,1}$. A classifier $\hat{y}^{\beta,1}$ is consequently deduced such that $$\hat{y}^{\beta,1}(x)=j \text{ if } f_j^{\beta,1}(x)\leq f_k^{\beta,1}(x), k\in S.$$

In other words, the minimizers $f_1^{\beta,1}, \ldots, f_m^{\beta,1}$ are generated by minimizing the weighted cost function $\Phi^{\beta,1}$ among $\Theta(q)$, the set of all q-dimensional member functions. The minimizers $f_1^{\beta,1}, \ldots, f_m^{\beta,1}$ are the objectives pursued to construct the classifier $\hat{y}^{\beta,1}$, which is a QMS classifier in the present invention.

Repeat the aforementioned procedure for $l=2, \ldots, m$. In the end, we have m classifiers $\hat{y}^{\beta,1}, \hat{y}^{\beta,2}, \ldots, \hat{y}^{\beta,m}$.

(Detail-Step Q136: Constructing Weighted Cost Functions with a Heavier Weight $\gamma>1$)

It is noted that the aforementioned weighted cost functions $\Phi^{\beta,1}, \ldots, \Phi^{\beta,m}$ are constructed with the lighter weight $\beta\in(0,1)$. On the other hand according to the present invention, a heavier weight $\gamma>1$ is employed to construct weighted cost functions $\Phi^{\gamma,1}, \ldots, \Phi^{\gamma,m}$.

In particular, fix a suitable constant $\gamma>1$ to be a heavier weight and consider sums of costs with the heavier weight $\gamma$ placed on the respective costs contributed by $\Omega_{tr}(j)$, $j\in S$. These weighted cost functions are denoted as $$\Phi^{\gamma,j}(f_1, \ldots, f_m)=c(1)+\ldots+c(j-1)+\gamma\cdot c(j)+ c(j+1)+\ldots+c(m), j\in S.$$

(Detail-Step Q137: Executing Training Process Based on the Weighted Cost Functions with the Heavier Weight $\gamma$)

By redoing everything similarly as described above in the detail-step Q135, including solving minimizers and generating their corresponding classifiers, we have m more classifiers $\hat{y}^{\gamma,1}, \hat{y}^{\gamma,2}, \ldots, \hat{y}^{\gamma,m}$.

In summary, 2m classifiers $\hat{y}^{\beta,1}, \hat{y}^{\beta,2}, \ldots, \hat{y}^{\beta,m}, \hat{y}^{\gamma,1}, \hat{y}^{\gamma,2}, \ldots, \hat{y}^{\gamma,m}$ have been developed by the quadratic multiform separation with weights of the present invention.

(Eclectic Classifier)

An eclectic classifier of the present invention employs the results of multiple models and outputs a balanced answer.

As it seems that there is no single classifier model (or algorithm) that solves every classification problem with the best accuracy, this methodology takes several, say $\ell>1$, solutions/algorithms together. Each element is tested by these $\ell$ algorithms to get $\ell$ classification results. Subsets are constructed by gathering elements with the same $\ell$ classification results. These subsets are disjoint and form a decomposition of the training set $\Omega_{tr}$.

Since the genuine membership of every element in the training set $\Omega_{tr}$ is known, some statistical analyses can be done for the subset, and a classification decision for the subset, in particular, every element of the subset, can be reached by a predetermined rule, for example, by majority vote.

(Main Step R1: Combining Developed Classifiers)

Now we give more details. Collect all 2m classifiers $\hat{y}^{\beta,1}, \ldots, \hat{y}^{\beta,m}, \hat{y}^{\gamma,1}, \ldots, \hat{y}^{\gamma,m}$ developed by the aforementioned quadratic multiform separation with weights.

A vector function $V:\Omega\to S^{2m}$ is defined as $$V(x)=(\hat{y}^{\beta,1}(x), \ldots, \hat{y}^{\beta,m}(x), \hat{y}^{\gamma,1}(x), \ldots, \hat{y}^{\gamma,m}(x))\in S^{2m}, x\in\Omega.$$

(Main Step R2: Creating Buckets with Identities)

As y and $\hat{y}$ induce partitions of $\Omega_{tr}$, so does the vector function V. That is, $$\Omega_{tr} = \bigcup_{I\in S^{2m}} B(I)$$

where, for any $I\in S^{2m}$, $$B(I)=\{x\in\Omega_{tr}: V(x)=I\}.$$

We shall call V(•) the identity function. Each $I\in S^{2m}$ is called an "identity" and B(I) is referred to as a "bucket" with the identity I. In the following description, when an element x is said distributed to B(I), it means that V(x)=I.

(Main Step R3: Merging Buckets)

It can be understood that totally there are $m^{2m}$ (m to the 2m-th power) buckets. The plan is to assign a membership to each bucket, instead of each individual element. Certainly, such assignment is determined by the composition of the elements in the bucket. This raises a question: how can it be done if a bucket is empty? Furthermore, buckets having only few elements usually carry poor information, and thus likely lead to incorrect answers. Therefore empty buckets and small buckets with very few elements need to be merged into large buckets.

For this purpose, define, $n_{B(I)}=|B(I)|$ and $n_{B(I)}(j)=|B(I) \cap \Omega_{tr}(j)|$, and obviously, $n_{B(I)}=\sum_{j=1}^{m} n_{B(I)}(j)$. (It is noted that, for a finite set A, the cardinality $|A|$ is the number of elements of A, as previously mentioned.)

Let $\delta>0$ be a positive constant. In a possible way, a merged bucket B may be obtained in such a way that the condition $$\max_{j \in S}\left\{\frac{n_B(j)}{n_{tr}(j)}\right\} \geq \delta.$$

$\delta>0$ is predetermined and problem dependent. A merged bucket will still be denoted as B(I) with I being any one of the identities for which B(I) is part of this merged bucket. Consequently, a merged bucket has more than one way of representation. (For example, when B((1,2,2,3)) and B((1,2,3,3)) are merged into a large bucket satisfying the aforementioned condition, B((1,2,2,3)) can be chosen to denote the merged bucket, for the sake of simplifying the representation of the merged bucket. However, it is also possible to choose B((1,2,3,3)) as an alternative representation of the merged bucket.)

(Main Step R4: Assigning Memberships)

Then, memberships are assigned respectively to the buckets. Such assignment may be done in many ways. One possible approach is illustrated in the following description.

Let a bucket B(I) with identity I be given. Assign the bucket a membership j if the ratio of the number of elements with membership j in B(I) to $|\Omega_{tr}(j)|$ is maximal among ratios of all memberships. This defines a function Y:{B(I)}→S that assigns respective memberships to respective buckets:

$$Y(B(I)) = j \text{ if } \max_{1 \leq k \leq m}\left\{\frac{|B(I) \cap \Omega_{tr}(k)|}{|\Omega_{tr}(k)|}\right\} = \frac{|B(I) \cap \Omega_{tr}(j)|}{|\Omega_{tr}(j)|}.$$

It should be emphasized that there are many ways to determine the membership of a bucket, and which then result in different functions Y.

(Main Step R5: Configuring an Eclectic Classifier)

We are ready to solve the classification problem. Given any element $x \in \Omega$, apply V on x to obtain its identity $I=V(x) \in S^{2m}$. Accordingly, x is distributed to the bucket B(I) which has the membership Y(B(I)). The eclectic classifier $\tilde{y}:\Omega \to S$ asserts that Y(B(I)), the membership of the bucket, is also the membership of x. In other words, every element inherits the membership of the bucket to which it is distributed.

The following is then the formal definition of the eclectic classifier $\tilde{y}:\Omega \to S$ of the present invention:

$$V(x)=(\hat{y}^{\beta,1}(x), \ldots, \hat{y}^{\beta,m}(x), \hat{y}^{\gamma,1}(x), \ldots, \hat{y}^{\gamma,m}(x)) \in S^{2m},$$

$$\tilde{y}(x)=Y(B(V(x))), x \in \Omega.$$

It can be seen that the eclectic classifier $\tilde{y}$ is derived by combining the 2m classifiers $\hat{y}^{\beta,1}, \ldots, \hat{y}^{\beta,m}, \hat{y}^{\gamma,1}, \ldots, \hat{y}^{\gamma,m}$ developed by the aforementioned quadratic multiform separation with weights.

However, it is not necessary that all of the 2m developed classifiers in the eclectic classifier $\tilde{y}$ come from the aforementioned quadratic multiform separation with weights. In the creation of buckets, we may add or remove any one or more particular developed classifiers in the identity function V(•).

(Loyalty Type)

Observe that, as the lighter weight $\beta \in (0,1)$, that is, $0<\beta<1$, gets smaller in $\Phi^{\beta,1}$ ($f_1, \ldots, f_m$) defined in the detail-step Q134, the optimization in the detail-step Q135 cares less about the characteristics presented by the samples (or the elements) with membership "1" As a result, an element must present sufficiently convincing evidence so as to be assigned membership "1" by the trained classifier $\hat{y}^{\beta,1}$(•). For convenience, let E($\beta$) be the set of elements assigned membership 1 by $\hat{y}^{\beta,1}$(•), and E the corresponding set obtained by the classifier trained with $\Phi$ defined in the detail-step Q133, which is equally weighted with weight 1. The above heuristic reasoning yields two implications: the size of E($\beta$) would be smaller, while the prediction accuracy, or the percentage of correctly classified samples, should become higher, compared to those of E. Differently stated, the samples (or elements) extracted by the classifier $\hat{y}^{\beta,1}$(•) should have "strong loyalty" to membership 1. This observation holds for any membership $j \in S$.

On the other hand, elements rejected by $\hat{y}^{\beta,j}$ but accepted by $\hat{y}^{\gamma,j}$, $\gamma>1$, seem to have "weak loyalty" to membership j. This reasoning motivates the invention of loyalty type. Loyalty types may be regarded as data structures.

Recall that each identity I is a vector with 2m coordinates. For $k=1, \ldots, m$, denote the identity with value k at the k-th coordinate by:

$$I(\beta, k) = \left( \overbrace{*, \ldots, *,\underbrace{k}_{\text{the } k\text{-th coordinate}}, *, \ldots, *,}^{\text{the first } m \text{ coordinates}} \overbrace{*, \ldots, *}^{\text{the second } m \text{ coordinates}} \right),$$

and denote the identity with value k at the (m+k)-th coordinate by $$I(\gamma, k) = \left( \overbrace{*, \ldots, *,}^{\text{the first } m \text{ coordinates}} \overbrace{*, \ldots, *, \underbrace{k}_{\text{the } (m+k)\text{-th coordinate}}, *, \ldots, *,}^{\text{the second } m \text{ coordinates}} \right).$$

Let $x \in \Omega$. Strong loyalty, weak loyalty, and normal loyalty are defined below, respectively.

An element x has a membership k with strong loyalty if V(x)=I($\beta$,k) and $\tilde{y}(x)=k=Y(B(I(\beta,k)))$.

An element x has a membership k with weak loyalty if x is not strongly loyal to any membership, and V(x)=I($\gamma$,k), and $\tilde{y}(x)=k=Y(B(I(\gamma,k)))$.

An element is said to have normal loyalty if it has neither strong loyalty nor weak loyalty.

It is noted that an element x has weak loyalty if it does not satisfy the condition of strong loyalty for any $j=1, \ldots, m$, and the conditions for weak loyalty hold for x for some $k \in S$.

For convenience, let T={Strong, Normal, Weak} be the set of possible loyalty types. Also let $\tau:\Omega \to T$ be the "loyalty type function" such that $\tau(x)$ gives the loyalty type of x.

Combining the "QMS with weights" and the "eclectic classifier" to one single mapping, define $\zeta: \Omega \to S \times T$ by $$\zeta(x) = (\tilde{y}(x), \tau(x)) \in S \times T, \ x \in \Omega.$$

In this way, the first component $\tilde{y}(x)$ of $\zeta(x)$ indicates the membership of x, and the second component $\tau(x)$ of $\zeta(x)$ indicates the crucial information expressed as the loyalty type of x.
(Number of Loyalty Types)

It can be understood that, in addition to strong loyalty, weak loyalty, and normal loyalty, more loyalty types can be established. Supposedly, by varying the weights continuously, a continuum loyalty type can be realized which corresponds to the notion of "level of confidence" proposed by the same applicant On the other hand, observe that when m=2, the analysis of the sum $\beta \cdot c(1) + c(2)$ is equivalent to that of $$c(1) + \frac{1}{\beta} \cdot c(2).$$

In this case, only the training process with lighter weight $\beta$ is performed, and there are only two loyalty types: strong and normal.
(Application of Strong Loyalty Type)

It is to be understood that the subset of elements with strong loyalty type brings benefits that reaches an accuracy higher than the average one.

Note that the classifier $\zeta$ introduces a finer decomposition of $\hat{\Omega}_{tr}$ than that given in the preliminary step P4. More precisely, each $\hat{\Omega}_{tr}(j) = \{x \in \hat{\Omega}_{tr} : \tilde{y}(x) = j\}$, $j \in S$, is a disjoint union of three subsets:

$$\hat{\Omega}_{tr}(j) = \hat{\Omega}_{tr}(j, \text{Strong}) \cup \hat{\Omega}_{tr}(j, \text{Normal}) \cup \hat{\Omega}_{tr}(j, \text{Weak}), \ j \in S$$

where $$\hat{\Omega}_{tr}(j, \text{Strong}) = \{x \in \hat{\Omega}_{tr} : \zeta(x) = (j, \text{Strong})\},$$

$$\hat{\Omega}_{tr}(j, \text{Normal}) = \{x \in \hat{\Omega}_{tr} : \zeta(x) = (j, \text{Normal})\},$$

$$\hat{\Omega}_{tr}(j, \text{Weak}) = \{x \in \hat{\Omega}_{tr} : \zeta(x) = (j, \text{Weak})\},$$

Recall that $n_{tr} = |\Omega_{tr}|$. Since the considered subsets are disjoint, we have $$n_{tr} = |\Omega_{tr}| = \sum_{j=1}^{m} \left( |\hat{\Omega}_{tr}(j, \text{Strong})| + |\hat{\Omega}_{tr}(j, \text{Normal})| + |\hat{\Omega}_{tr}(j, \text{Weak})| \right).$$

The overall prediction accuracy $\mu_{tr}$ is $$\mu_{tr} = \frac{\sum_{j=1}^{m} |\hat{\Omega}_{tr}(j) \cap \Omega_{tr}(j)|}{|\Omega_{tr}|} =$$

$$\mu_{tr}(\text{Strong}) \frac{n_{tr}(\text{Strong})}{n_{tr}} + \mu_{tr}(\text{Normal}) \frac{n_{tr}(\text{Normal})}{n_{tr}} + \mu_{tr}(\text{Weak}) \frac{n_{tr}(\text{Weak})}{n_{tr}},$$

Here $$n_{tr}(\text{Strong}) = \sum_{j=1}^{m} |\hat{\Omega}_{tr}(j, \text{Strong})|,$$

$$n_{tr}(\text{Normal}) = \sum_{j=1}^{m} |\hat{\Omega}_{tr}(j, \text{Normal})|,$$

$$n_{tr}(\text{Weak}) = \sum_{j=1}^{m} |\hat{\Omega}_{tr}(j, \text{Weak})|,$$

are the respective number of elements with the indicated loyalty types in training set, and $$\mu_{tr}(\text{Strong}) = \frac{\sum_{j=1}^{m} |\hat{\Omega}_{tr}(j, \text{Strong}) \cap \Omega_{tr}(j)|}{n_{tr}(\text{Strong})},$$

$$\mu_{tr}(\text{Normal}) = \frac{\sum_{j=1}^{m} |\hat{\Omega}_{tr}(j, \text{Normal}) \cap \Omega_{tr}(j)|}{n_{tr}(\text{Normal})},$$

$$\mu_{tr}(\text{Weak}) = \frac{\sum_{j=1}^{m} |\hat{\Omega}_{tr}(j, \text{Weak}) \cap \Omega_{tr}(j)|}{n_{tr}(\text{Weak})},$$

are the local prediction accuracy (the accuracy of $\zeta$ or $\hat{y}$) of strong, normal, and weak loyalty types, respectively.

By the observation given at the beginning of the previous section "loyalty type", apparently it appears that $$\mu_{tr}(\text{Strong}) > \mu_{tr} > \mu_{tr}(\text{Weak}),$$

$$\mu_{tr}(\text{Strong}) > \mu_{tr}(\text{Normal}) > \mu_{tr}(\text{Weak}).$$

One embodiment in the following description provides test results of the loyalty extraction machine of the present invention on Fashion-MNIST samples, which evidences the aforementioned relationships.

Other objects, advantages, and novel features of the invention will become more apparent from the following detailed description when taken in conjunction with the accompanying drawings.

DETAILED DESCRIPTION OF THE EMBODIMENT

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not means that there is essentially a level, a rank, an executing order, or a manufacturing order among the elements, except otherwise specified. A "first" element and a "second" element may exist together in the same component, or alternatively, they may exist in different components, respectively. The existence of an element described by a greater ordinal number does not essentially mean the existent of another element described by a smaller ordinal number.

Moreover, in the present specification, the terms, such as "preferably" or "advantageously", are used to describe an optional or additional element or feature, and in other words, the element or the feature is not an essential element, and may be ignored in some embodiments.

Moreover, each component may be realized as a single circuit or an integrated circuit in suitable ways, and may include one or more active elements, such as transistors or logic gates, or one or more passive elements, such as resistors, capacitors, or inductors, but not limited thereto. Each component may be connected to each other in suitable ways, for example, by using one or more traces to form series connection or parallel connection, especially to satisfy the requirements of input terminal and output terminal. Furthermore, each component may allow transmitting or receiving input signals or output signals in sequence or in parallel. The aforementioned configurations may be realized depending on practical applications.

Moreover, in the present specification, the terms, such as "system" "apparatus", "device", "module", or "unit", refer to an electronic element, or a digital circuit, an analogous circuit, or other general circuit, composed of a plurality of electronic elements, and there is not essentially a level or a rank among the aforementioned terms, except otherwise specified.

Moreover, in the present specification, two elements may be electrically connected to each other directly or indirectly, except otherwise specified. In an indirect connection, one or more elements may exist between the two elements.

Figure 1:
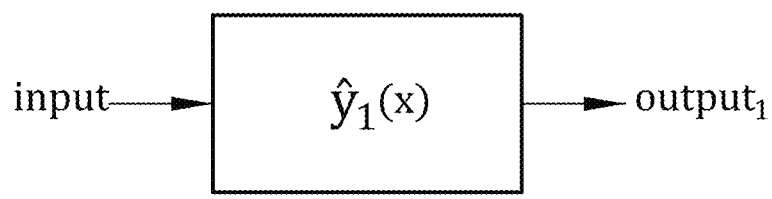
FIG. 1 shows a schematic diagram of a prior art classifier.
Figure 1:
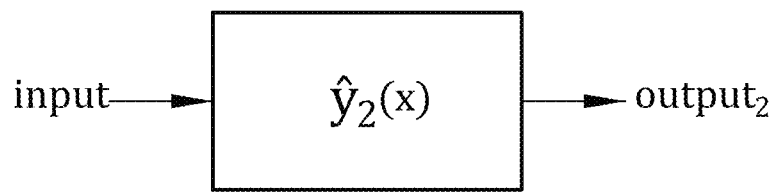
Figure 1:
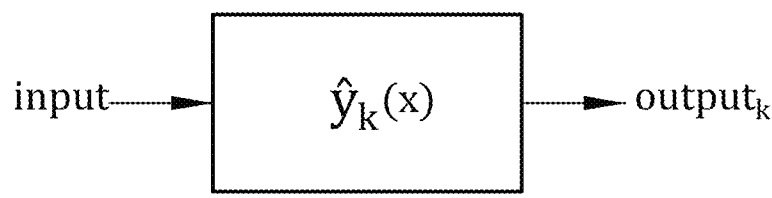
Figure 2:
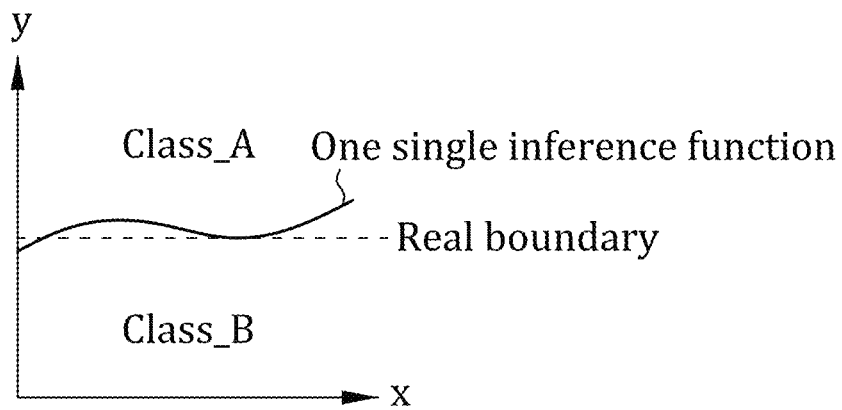
FIG. 2 shows a schematic diagram of classification accomplished by one single inference function of a prior art classifier.
Figure 3:
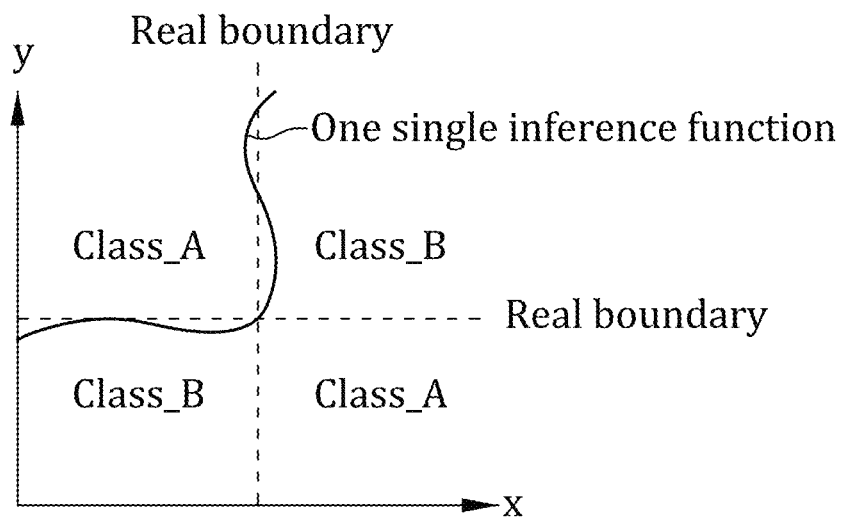
FIG. 3 shows a problem that the prior art classifier may face.
Figure 4:
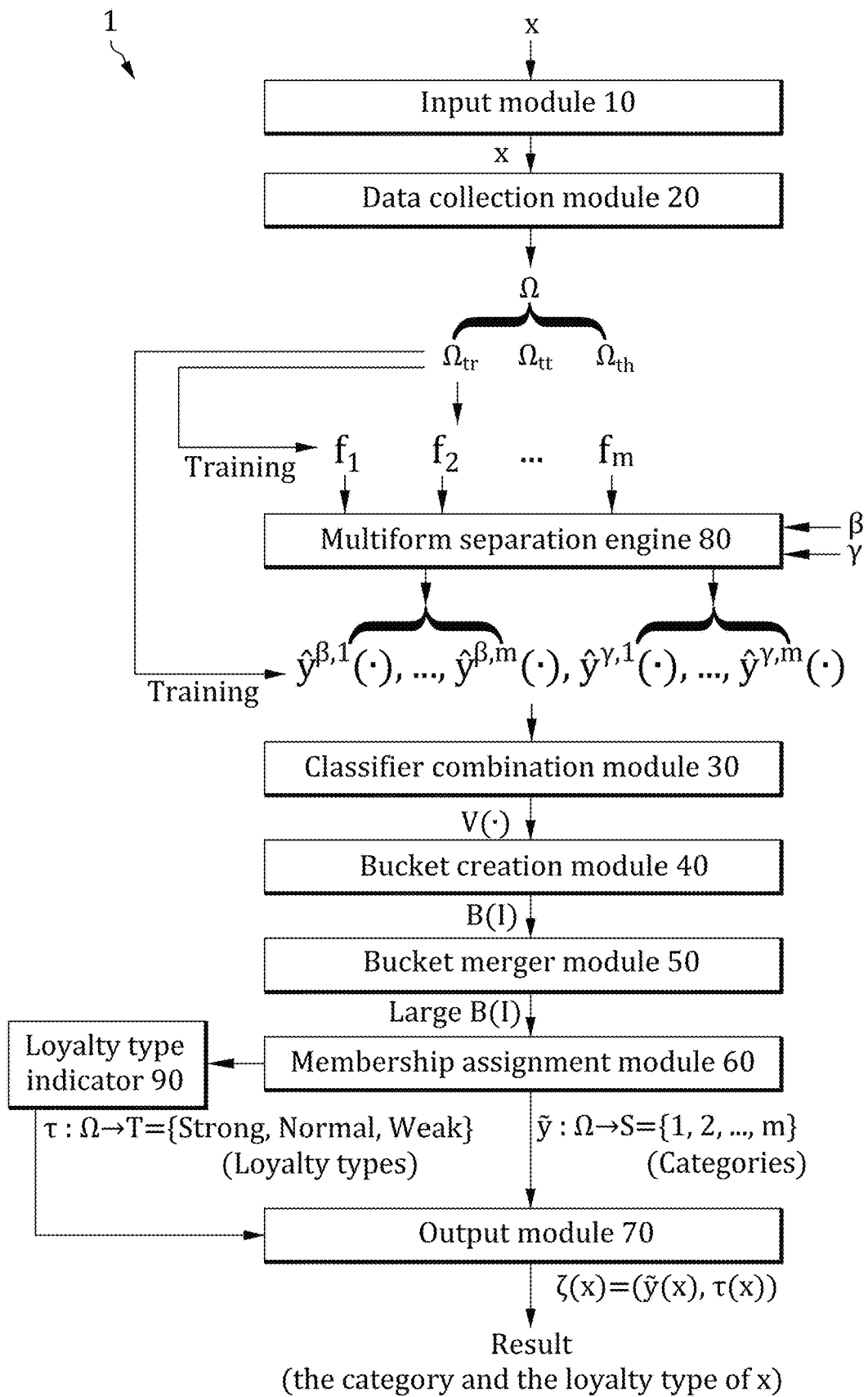
FIG. 4 shows a schematic block diagram of the loyalty extraction machine according to one embodiment of the present invention.

FIG. 4 shows a schematic block diagram of the loyalty extraction machine 1 according to one embodiment of the present invention.

The loyalty extraction machine 1 of the present invention is implemented by two parts, (quadratic) multiform separation and an eclectic classifier.

(Quadratic Multiform Separation with Weights)

As shown in FIG. 4, the loyalty extraction machine 1 of the present invention, provided in the context of machine learning, includes an input module 10, a data collection module 20, a (quadratic) multiform separation engine 80, a classifier combination module 30, a bucket creation module 40, a bucket merger module 50, a membership assignment module 60, and an output module 70.

It can be understood that the modules or engines are illustrated here for the purpose of explaining the present invention, and the modules or engines may be integrated or separated into other forms as hardware or software in separated circuit devices on a set of chips or an integrated circuit device on a single chip. The royalty extraction machine 1 may be implemented in a cloud server or a local computer. The modules or engines of the present invention may be suitably converted into several steps of a method, and several steps of a method may be suitably converted into several modules or engines as well. The modules, engines, and steps of the present invention provide their respective functions of data processing that realize and/or optimize the algorithm of the present invention.

The input module 10 is configured to receive sample data (or an element) x. The input module 10 may be a sensor, a camera, a speaker, and so on, that can detect physical phenomena, or it may be a data receiver.

The data collection module 20 is connected to the input module and configured to store a collection of data $\Omega$ from the input module 10. The collection of data $\Omega \subset \mathbb{R}^p$ includes a training set $\Omega_{tr}$ and/or a test set $\Omega_{tt}$ and/or a remaining set $\Omega_{th}$. Here $\mathbb{R}$ is the set of real numbers and the expression $\Omega \subset \mathbb{R}^p$ means that the collection of data $\Omega$ belongs to $\mathbb{R}^p$, the space of p-dimensional real vectors. The collection of data $\Omega$ may also be regarded as a data structure.

With supervised approach, a membership function $y:\Omega \to S=\{1,2, \ldots, m\}$ can be found so that $y(x)$ gives precisely the membership of the input data x. Accordingly, the collection of data $\Omega$ is composed of m memberships (or data categories), and the m memberships are digitized as 1, 2, ..., m. To specifically explain the meaning of the data categories, for example, when a classifier is used to recognize animal pictures, membership "1" may indicate "dog", membership "2" may indicate "cat", ..., and membership "m" may indicate "rabbit". Herein, "dog", "cat", and "rabbit" are regarded as the data categories. For another example, when a classifier is used to recognize people's age by their faces, membership "1" may indicate "child", membership "2" may indicate "teenage", ..., and membership "m" may indicate "adult". Herein, "child", "teenage", and "adult" are regarded as the data categories.

Figure 5:
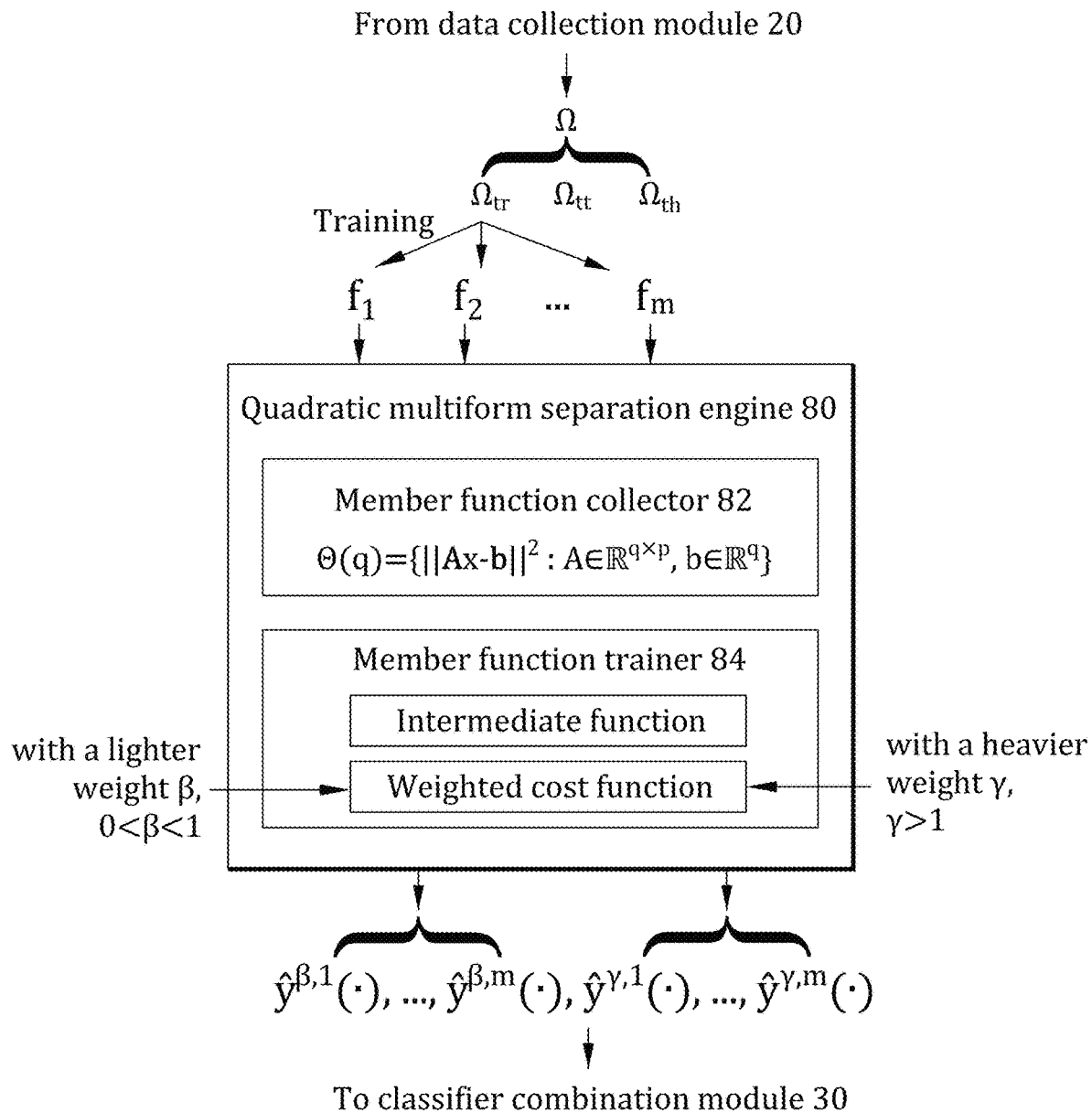
FIG. 5 shows a detailed block diagram of the (quadratic) multiform separation engine according to one embodiment of the present invention.

FIG. 5 shows a detailed block diagram of the (quadratic) multiform separation engine 80 according to one embodiment of the present invention.

The (quadratic) multiform separation engine 80 includes a member function collector 82 and a member function trainer 84. The (quadratic) multiform separation engine 80 is connected to the data collection module 20 and configured to use m piecewise continuous functions $f_1, f_2, \ldots, f_m$ to perform classification. The m piecewise continuous functions $f_1, f_2, \ldots, f_m$ typically handle the same type of data, for example, they all handle image files for image recognition, all handle audio files for sound recognition, and so on, so that they can work consistently.

The classification involves two stages (or modes): a training (or learning) stage and a prediction (or decision) stage.

Loosely speaking, a function $h: \mathbb{R}^p \to \mathbb{R}$ is called a piecewise continuous function if there exist finite disjoint subsets $D_1, \ldots, D_w$ such that $D_1 \cup \ldots \cup D_w = \mathbb{R}^p$, and f is continuous on the interior of $D_j$, $j=1, \ldots, w$.

In this embodiment, each piecewise continuous function $f_j(x)$ is set to be a quadratic function of the sample data x. In particular, let $q \in \mathbb{N}$ be given, where N represents the set of natural numbers. A function $f: \mathbb{R}^p \to \mathbb{R}$ is called a q-dimensional member function if it is of the form $$f(x) = \|Ax - b\|^2$$

for a constant matrix $A \in \mathbb{R}^{q \times p}$ and a constant vector $b \in \mathbb{R}^q$, where $\|\cdot\|$ denotes the Euclidean norm. In particular, $$A = \begin{pmatrix} a_{11} & \cdots & a_{1p} \\ \vdots & \ddots & \vdots \\ a_{q1} & \cdots & a_{qp} \end{pmatrix}$$

$$x = \begin{pmatrix} x_1 \\ \vdots \\ x_p \end{pmatrix}$$

$$b = \begin{pmatrix} b_1 \\ \vdots \\ b_q \end{pmatrix}$$

Fix an integer q that is sufficiently large. Generate m q-dimensional member functions $f_j: \mathbb{R}^p \to \mathbb{R}$, $j=1, \ldots, m$, based on the training sets $\Omega_{tr}$. As will be discussed later, the constant matrices $A_1, \ldots, A_m$ and the constant vectors $b_1, \ldots, b_m$ of the m q-dimensional member functions are items to be solved.

Accordingly, the member function collector 82 of the (quadratic) multiform separation engine 80 is configured to store a set of member functions, denoted by $\Theta(q)$. That is, $\Theta(q)=\{\|Ax-b\|^2$:constant matrix $A\in \mathbb{R}^{q\times p}$, constant vector $b\in \mathbb{R}^q\}$.

The member function trainer 84 of the (quadratic) multiform separation engine 80 is configured to perform the training process.

According to the present invention, in the training process, $m^2$ control parameters $\alpha_{jk}$, $j=1, \ldots, m$, $k=1, \ldots, m$ are set to participate comparisons among the m member functions, and the comparisons are performed according to a specific operator. Preferably, the $m^2$ control parameters $\alpha_{jk}$, $j=1, \ldots, m$, $k=1, \ldots, m$ are set between 0 and 1, and they are not necessarily distinct.

With the m q-dimensional member functions $f_1, \ldots, f_m$, and the $m^2$ control parameters $\alpha_{jk}$, $j=1, \ldots, m$, $k=1, \ldots, m$, intermediate functions $\varphi_{jk}:\Omega \to \mathbb{R}$, $j=1, \ldots, m$, $k=1, \ldots, m$, are defined by $$\varphi_{jk}(x) = \max\left\{\alpha_{jk}, \frac{f_j(x)}{f_k(x)}\right\},$$

Obviously, $\varphi_{jk}(x)<1$ if and only if $f_j(x)<f_k(x)$, $j\in S$, $k\in S$, $k\neq j$. It is noted that $S=\{1, 2, \ldots, m\}$ is the set of memberships.

The training process will be more efficient with the introduction of the control parameters.

It is to be understood that the goal of the training process according to the present invention is to match the property "x has membership j" for $j=1, \ldots, m$, with the algebraic relations $\varphi_{jk}(x)<1$, $k\in S$, $k\neq j$.

In order to reach the goal, for $j\in S$, define $$c(j) = c(j; f_1, \ldots, f_m) = \sum_{x\in \Omega_{tr}(j)} \sum_{k\in S, k\neq j} \varphi_{jk}(x)$$

where c(j) represents the cost contributed by $\Omega_{tr}(j)$, $j\in S$.

Now we explain the case of membership 1 carefully. In this case, a lighter weight β is applied to c(1). The rest cases can be carried out similarly and therefore will be skipped. In those cases, the lighter weight β is applied alternatively to c(2), . . . , c(m).

Fix a suitable constant $\beta \in (0,1)$, that is, $0<\beta<1$, to be a lighter weight and construct a weighted cost function in which the lighter weight β is placed on the cost contributed by $\Omega_{tr}(1)$:

$$\beta \cdot c(1)+c(2)+ \ldots +c(m)=\Phi^{\beta,1}(f_1, \ldots, f_m).$$

The quantity of the weighted cost function $\Phi^{\beta,1}$ provides a performance measure for separating the training subsets $\Omega_{tr}(1), \ldots, \Omega_{tr}(m)$, by the given member functions $f_1, \ldots, f_m$, while the influence by the elements of membership 1 is weakened by a lighter weight $\beta \in (0,1)$.

With the integer q, the $m^2$ control parameters $\alpha_{jk}$, $j=1, \ldots, m$, $k=1, \ldots, m$, the lighter weight β, and the training set $\Omega_{tr}$ given, and q sufficiently large, the weighted cost function $\Phi^{\beta,1}$ defined above therefore depends only on the constant matrices $A_1, \ldots, A_m$ and the constant vectors $b_1, \ldots, b_m$ that define the member functions $f_1, \ldots, f_m$.

The minimizers $f_1^{\beta,1}, \ldots, f_m^{\beta,1}$ are generated by solving $$\min_{f_1, \ldots, f_m \in \Theta(q)} \Phi^{\beta,1}(f_1, \ldots, f_m) =$$

$$\min_{f_1, \ldots, f_m \in \Theta(q)} \left\{\beta \cdot c(1; f_1, \ldots, f_m) + \sum_{k=2}^{m} c(k; f_1, \ldots, f_m)\right\}$$

The minimizers $f_1^{\beta,1}, \ldots, f_m^{\beta,1}$ are the objectives pursued in the training process performed by the member function trainer 84. They are used to construct the classifier $\hat{y}^{\beta,1}$ of the present invention.

As shown in FIG. 5, with the lighter weight $\beta \in (0,1)$ placed on c(1), we can obtain the developed classifier $\hat{y}^{\beta,1}$. Similarly, with β placed on c(2), . . . , c(m), we can correspondingly obtain developed classifiers $\hat{y}^{\beta,2}, \ldots, \hat{y}^{\beta,m}$.

On the other hand, fix a suitable constant $\gamma>1$ to be a heavier weight and consider sums of costs with the heavier weight γ placed on the respective costs contributed by $\Omega_{tr}(j)$, $j\in S$, these weighted cost functions are denoted as $$\Phi^{\gamma,j}(f_1, \ldots, f_m)=c(1)+ \ldots +c(j-1)+\gamma \cdot c(j)+ c(j+1)+ \ldots +c(m), j\in S.$$

By redoing everything similarly as described above including solving minimizers and generating their corresponding classifiers, we have m more classifiers $\hat{y}^{\gamma,1}, \hat{y}^{\gamma,2}, \ldots, \hat{y}^{\gamma,m}$.

In summary, 2m classifiers $\hat{y}^{\beta,1}, \hat{y}^{\beta,2}, \ldots, \hat{y}^{\beta,m}, \hat{y}^{\gamma,1}, \hat{y}^{\gamma,2}, \ldots, \hat{y}^{\gamma,m}$ have been developed by the quadratic multiform separation with weights of the present invention.

(Eclectic Classifier)

Referring back to FIG. 4, in the loyalty extraction machine 1, the classifier combination module 30 is connected to the (quadratic) multiform separation engine 80 and the data collection module 20 and configured to combine 2m developed classifiers $\hat{y}^{\beta,1}, \ldots, \hat{y}^{\beta,m}, \hat{y}^{\gamma,1}, \ldots, \hat{y}^{\gamma,m}$, m≥2, trained with the training set $\Omega_{tr}$, wherein 2m is the number of developed classifiers. Each of the developed classifiers $\hat{y}^{\beta,1}, \ldots, \hat{y}^{\beta,m}, \hat{y}^{\gamma,1}, \ldots, \hat{y}^{\gamma,m}$.

However, it is not necessary that all of the 2m developed classifiers in the loyalty extraction machine 1 come from the aforementioned quadratic multiform separation with weights. In the creation of buckets, we may add or remove any one or more particular developed classifiers. One or more developed classifiers may employ one model from convolutional neural network (CNN), recurrent neural network (RNN), long short-term memory (LSTM) network, YOLO, ResNet, ResNet-18, ResNet-34, Vgg16, GoogleNet, Lenet, MobileNet, decision trees, or support vector machine (SVM), but not limited thereto.

The developed classifiers $\hat{y}^{\beta,1}, \ldots, \hat{y}^{\beta,m}, \hat{y}^{\gamma,1}, \ldots, \hat{y}^{\gamma,m}$ should be adjusted or trained to have different architectures (regarding the number of neurons, their connections, weights, or bias) even if they employ the same module from the aforementioned models. However, the developed classifiers $\hat{y}^{\beta,1}, \ldots, \hat{y}^{\beta,m}, \hat{y}^{\gamma,1}, \ldots, \hat{y}^{\gamma,m}$ typically handle the same type of data, for example, they all handle image recognition, all handle sound recognition, and so on.

In particularly, the developed classifiers $\hat{y}^{\beta,1}, \ldots, \hat{y}^{\beta,m}, \hat{y}^{\gamma,1}, \ldots, \hat{y}^{\gamma,m}$ are combined to form a vector function defined as $$V(x)=(\hat{y}^{\beta,1}(x), \ldots, \hat{y}^{\beta,m}(x), \hat{y}^{\gamma,1}(x), \ldots, \hat{y}^{\gamma,m}(x)))\in S^{2m}, x\in \Omega.$$

Here, each V(x) is a preliminary result given by the developed classifiers $\hat{y}^{\beta,1}, \ldots, \hat{y}^{\beta,m}, \hat{y}^{\gamma,1}, \ldots, \hat{y}^{\gamma,m}$, and it is a 2m-dimensional real vector, and $S^{2m}$ collects the preliminary results for $x \in \Omega$. The preliminary results will be further processed as follows.

The bucket creation module 40 is connected to the classifier combination module 30 and configured to partition the training set $\Omega_{tr}$ into buckets B(I) with identities I. That is, $$\Omega_{tr} = \bigcup_{I \in S^{2m}} B(I)$$

where, for any identity $I \in S^{2m}$, $$B(I) = \{x \in \Omega_{tr} : V(x) = I\}.$$

When an element x is said distributed to B(I), it means that V(x)=I. The identities I are associated with characteristics of the data.

It can be understood that the buckets are also data sets created to realize the classification according to the present invention. To specifically explain the meaning of the bucket B(I) and its identity I, for example, in case of m=3 and k=4, a possible form of the identity may be I=(1,2,2,3), and a possible form of the bucket may be B(I)=B((1,2,2,3))=$\{x \in \Omega_{tr} : \hat{y}^{\beta,1}(x)=1, \hat{y}^{\beta,2}(x)=2, \hat{y}^{\beta,3}(x)=2, \hat{y}^{\beta,4}(x)=3\}$.

The bucket merger module 50 is connected to the bucket creation module 40 and configured to merge empty buckets and/or small buckets into large buckets, for example, according to their cardinalities, so as to reduce the bias caused by the rareness of data therein.

In particular, it is possible to define $n_B(I) = |B(I)|$ and $n_{B(I)}(j) = |B(I) \cap \Omega_{tr}(j)|$, and obviously, $n_{B(I)} = \sum_{j=1}^{m} n_{B(I)}(j)$. The bucket creation module 40 is then further configured to define (or denote) the cardinality $n_{B(I)}(j)$ of a bucket B(I) with a membership j and the cardinality $n_{tr}(j)$ of a subset of the training set $\Omega_{tr}$ with the membership j, and to perform merger such that $$\max_{j} \left\{ \frac{n_B(j)}{n_{tr}(j)} \right\} \geq \delta$$

holds for certain predetermined positive constant $\delta$ between 0 and 1. The choice of the constant $\delta$ may be problem dependent, so a specific value of $\delta$ will not be given in the present description.

The membership assignment module 60 is indirectly connected to the bucket creation module 40 through the bucket merger module 50 and configured to assign respective memberships j's to the respective buckets B(I), for example, according to their cardinalities. The memberships j's refer to data categories of the training set $\Omega_{tr}$.

One possible approach is that: let a bucket B(I) in the training set $\Omega_{tr}$ with identity I be given. Assign the bucket B(I) a membership j if the ratio of the number of sample data (or elements) x's with membership j in B(I) to the cardinality $|\Omega_{tr}(j)|$ of a subset $\Omega_{tr}(j)$ of the training set $\Omega_{tr}$ with membership j is maximal among ratios of all memberships. This defines a function Y on the collection of buckets B(I) to S that $$Y(B(I)) = j \text{ if } \max_{1 \leq k \leq m} \left\{ \frac{|B(I) \cap \Omega_{tr}(k)|}{|\Omega_{tr}(k)|} \right\} = \frac{|B(I) \cap \Omega_{tr}(j)|}{|\Omega_{tr}(j)|},$$

It should be emphasized that there are many ways to determine the membership of a bucket, and which then result in different functions Y.

Referring back to FIG. 4, the output module 70 is indirectly connected to the classifier combination module 30 through the bucket creation module 40, the bucket merger module 50, and the membership assignment module 60, and configured to derive an output result after the sample data x is processed through the classifier combination module 30. It should be emphasized that the classifier combination module 30 has combined 2m classifiers $\hat{y}^{\beta,1}, \ldots, \hat{y}^{\beta,m}, \hat{y}^{\gamma,1}, \ldots, \hat{y}^{\gamma,m}$ developed by the multiform separation engine 40.

The output result may be directly the membership j, or converted to the data category, such as "dog" "cat", or "rabbit" indicated by the membership. The output module 70 may include a display device to show the output result.

The eclectic classifier in combination with the "QMS with weights" of the present invention can be expressed by the following formal definition:

$$\tilde{y}(x) = Y(B(V(x))), \ x \in \Omega.$$

(Loyalty Type)

With the aforementioned implementation, the loyalty extraction machine 1 of the present invention can further include a loyalty type indicator 90 connected between the membership assignment module 60 and the output module 70 and configured to produce a label of loyalty type of a sample data (x) by confirming a location of a lighter weight ($\beta$) and/or a heavier weight ($\gamma$) used to form the vector function V(x).

Recalling that each identity I is a vector with 2m coordinates, for k=1, ..., m, the identity with value k at the k-th coordinate is denoted by:

$$I(\beta, k) = \left( \overbrace{*, \ldots, *, \underbrace{k}_{the\ k-th\ coordinate}, *, \ldots, *,}^{the\ first\ m\ coordinates} \overbrace{*, \ldots, *}^{the\ second\ m\ coordinates} \right),$$

and the identity with value k at the (m+k)-th coordinate is denoted by $$I(\gamma, k) = \left( \overbrace{*, \ldots, *,}^{the\ first\ m\ coordinates} \overbrace{*, \ldots, *, \underbrace{k}_{the\ (m+k)-th\ coordinate}, *, \ldots, *,}^{the\ second\ m\ coordinates} \right).$$

Let $x \in \Omega$. Strong loyalty, weak loyalty, and normal loyalty are defined below, respectively.

An element x has a membership k with strong loyalty if $V(x)=I(\beta,k)$ and $\tilde{y}(x)=k=Y(B(I(\beta,k)))$.

An element x has a membership k with weak loyalty if x is not strongly loyal to any membership, and $V(x)=I(\gamma,k)$, and $\tilde{y}(x)=k=Y(B(I(\gamma,k)))$.

An element is said to have normal loyalty if it have neither strong loyalty nor weak loyalty.

It is noted that an element x has weak loyalty if it does not satisfy the condition of strong loyalty for any j=1, ..., m, and the conditions for weak loyalty hold for x for some $k \in S$.

For convenience, let T={Strong, Normal, Weak} be the set of possible loyalty types. Also let $\tau:\Omega \to T$ be the "loyalty type function" such that $\tau(x)$ gives the loyalty type of x. Combining the "QMS with weights" and the "eclectic classifier" to one single mapping, define $\zeta:\Omega \to S \times T$ by $$\zeta(x) = (\tilde{y}(x), \tau(x)) \in S \times T, \ x \in \Omega.$$

In this way, the first component ỹ(x) of ζ(x) indicates the membership of x, and the second component τ(x) of ζ(x) indicates the crucial information expressed as the loyalty type of x.

Accordingly, the aforementioned formal definition can be regarded as the complete loyalty extraction machine 1 of the present invention.

In this embodiment, there are three loyalty types: strong loyalty, weak loyalty, and normal loyalty. It can be understood that, more loyalty types can be established. Supposedly, by varying the weights continuously, a continuum loyalty type can be realized which corresponds to the notion of "level of confidence" proposed by the same applicant. On the other hand, it is also possible to employ only two loyalty types: strong loyalty and normal loyalty, when only the training process with lighter weight β is performed.

(Test Results of the Loyalty Extraction Machine on Fashion-MNIST Samples)

In order to explain the importance and the application of the loyalty type derived according to the present invention, the test results of the loyalty extraction machine of the present invention is provided on Fashion-MNIST samples.

Fashion-MNIST is a dataset of Zalando's article images, consisting of a training set of 60,000 samples and a test set of 10,000 samples. Each sample is a 28×28 grayscale image, associated with a label from 10 categories (which are represented by "memberships" in the present invention). Fashion-MNIST is intended to serve as a direct drop-in replacement for the original MNIST dataset for benchmarking machine learning algorithms. It shares the same image size and structure of training and testing splits.

The loyalty extraction machine 1 of the present invention is implemented by machine learning algorithm that produces a classifier providing the following information (referring to FIG. 4) for each image in Fashion-MNIST:

(i) one loyalty type, such as strong, normal, or weak; and (ii) one predicted category label from 10 categories.

It is noted that more loyalty types and more categories may be defined according to other databases in other applications.

The following Table 1 summarizes the results for the training set. Let n be the total number of images in the data set. For each loyalty type, $n_1$ is the number of images assigned to this loyalty type, n2 is the number of images with correct category label prediction, and LPA is the so-called local prediction accuracy, which is the prediction accuracy for this loyalty type. The overall prediction accuracy, i.e., sum of all numbers in Column $n_2$ divided by n, is 95.09%. Equivalently, the overall prediction accuracy is equal to the inner product of two vectors, see column $n_1$/n and column LPA.

TABLE 1

| Loyalty type | $n_1$ | $n_1$/n | $n_2$ | LPA |
|---|---|---|---|---|
| Strong | 47,052 | 78.42% | 46,859 | 99.59% |
| Normal | 10,653 | 17.76% | 8,757 | 82.20% |
| Weak | 2.295 | 3.83% | 1,436 | 62.57% |

The following Table 2 summarizes the results for the test set. The overall prediction accuracy is 89.44%.

TABLE 2

| Loyalty type | $n_1$ | $n_1$/n | $n_2$ | LPA |
|---|---|---|---|---|
| Strong | 7,683 | 76.83% | 7,419 | 96.56% |
| Normal | 1,884 | 18.84% | 1,329 | 70.54% |
| Weak | 433 | 4.33% | 196 | 45.27% |

While the loyalty extraction machine of the present invention produces an overall prediction accuracy comparable to that of several leading methods, it produces much higher prediction accuracy for images with strong loyalty type. It is important to notice that the loyalty type of an image can be predetermined. Also, for the Fashion-MNIST samples, images with strong loyalty type exceeds 76% of the total images, both in training test and in test set In conclusion, the present invention provides multiple multiform separation classifiers, each of them appropriately utilizes multiple functions, so as to produce better solutions, in terms of accuracy, robustness, complexity, speed, dependency, cost, and so on. The multiple multiform separation classifiers are used as developed classifiers in an eclectic classifier. The eclectic classifier combines the results from the developed classifiers that can give a maximal ratio or a majority of predictions or decisions regarded as an optimal answer. In this way, the extreme influences of the disadvantages of the developed classifiers can be avoided, and the advantages of the developed classifiers can be jointly taken into consideration.

Although the present invention has been explained in relation to its preferred embodiment, it is to be understood that many other possible modifications and variations can be made without departing from the spirit and scope of the invention as hereinafter claimed.

What is claimed is:

1. A loyalty extraction machine, comprising:
an input module configured to receive sample data (x);
a data collection module connected to the input module and configured to store a collection of data (Ω) from the input module, the collection of data (Ω) including a training set ($Ω_{tr}$) and/or a test set ($Ω_{tt}$);
a multiform separation engine connected to the data collection module and configured to generate 2m developed classifiers ($ŷ^{β,1}, \ldots, ŷ^{β,m}, ŷ^{γ,1}, \ldots, ŷ^{γ,m}$), m≥2;
wherein the 2m developed classifiers are combined to form a vector function V(x)=($ŷ^{β,1}$(x), ..., $ŷ^{β,m}$(x), $ŷ^{γ,1}$(x), ..., $ŷ^{γ,m}$(x)), wherein an outcome of the vector function (V) is a 2m-dimensional vector and named an identity (I);
wherein, for generating the 2m developed classifiers ($ŷ^{β,1}, \ldots, ŷ^{β,m}, ŷ^{γ,1}, \ldots, ŷ^{γ,m}$), the multiform separation engine is configured to use m piecewise continuous functions to perform classification; the m piecewise continuous functions are respectively trained with the training set $Ω_{tr}$ through a training process;
wherein in the training process, m weighted cost functions $Φ^{β,1}, \ldots, Φ^{β,m}$ with a lighter weight β where 0<β<1 and m weighted cost functions $Φ^{γ,1}, \ldots, Φ^{γ,m}$ with a heavier weight γ where γ>1 provide performance measures for separating the training subsets $Ω_{tr}$(1), ..., $Ω_{tr}$(m), and are used respectively to derive member functions $f_1^{β,j}, \ldots, f_m^{β,j}$, j=1, ..., m, and $f_1^{γ,j}, \ldots f_m^{γ,j}$, j=1, ..., m;
a classifier combination module connected to the multiform separation engine and the data collection module and configured to combine the 2m developed classifiers ($\hat{y}^{\beta,1}, \ldots, \hat{y}^{\beta,m}, \hat{y}^{\gamma,1}, \ldots, \hat{y}^{\gamma,m}$), the developed classifiers ($\hat{y}^{\beta,1}, \ldots, \hat{y}^{\beta,m}, \hat{y}^{\gamma,1}, \ldots, \hat{y}^{\gamma,m}$) being trained with the training set ($\Omega_{tr}$);

an output module connected to the classifier combination module and configured to derive an output result after the sample data (x) is processed through the classifier combination module; and a loyalty type indicator associated with the output module and configured to determine loyalty type of a sample data (x) by confirming a location of the lighter weight ($\beta$) and/or the heavier weight ($\gamma$) in an identity (I);

wherein the loyalty extraction machine is realized as hardware or software in separated circuit devices on a set of chips or an integrated circuit device on a single chip, and the loyalty extraction machine is implemented in a cloud server or a local computer.

2. The loyalty extraction machine of claim 1, wherein, for a developed classifier, the multiform separation engine is configured to derive temporary evaluations $f_1(x), \ldots, f_m(x)$ from the m trained piecewise continuous functions $f_1, \ldots, f_m$ for a certain sample data x, and the sample data x is assigned to have a membership j by finding out a specific evaluation $f_j(x)$ after processing the temporary evaluations $f_1(x), \ldots, f_m(x)$ according to a specific operator.

3. The loyalty extraction machine of claim 2, wherein the specific operator is a minimum operator.

4. The loyalty extraction machine of claim 1, wherein each piecewise continuous function is a linear function, a quadratic function, a quartic function, a polynomial function, a rational function, an algebraic function, or a transcendental function.

5. The loyalty extraction machine of claim 4, wherein each piecewise continuous function $f_j(x)$ is a q-dimensional member function having a form $\|A_j x - b_j\|^2$, for an integer q, a constant matrix $A_j$, and a constant vector $b_j$, $j=1, \ldots, m$, and the m piecewise continuous functions become m member functions.

6. The loyalty extraction machine of claim 5, wherein in the training process, $m^2$ control parameters $\alpha_{jk}$, $j=1, \ldots, m$, $k=1, \ldots, m$ are set between 0 and 1 so as to participate comparisons among the m member functions $f_1, \ldots, f_m$, and the comparisons are performed according to intermediate functions $\varphi_{jk}: \Omega \to \mathbb{R}$, $j=1, \ldots, m$, $k=1, \ldots, m$, defined $$\varphi_{jk}(x) = \max\left\{\alpha_{jk}, \frac{f_j(x)}{f_k(x)}\right\}.$$

7. The loyalty extraction machine of claim 6, wherein in the training process, given the integer q, the $m^2$ control parameters $\alpha_{jk}$, $j=1, \ldots, m$, $k=1, \ldots, m$, and the training set $\Omega_{tr}$, the m weighted cost functions $\Phi^{\beta,1}, \ldots, \Phi^{\beta,m}$ with the lighter weight $\beta$ where $0<\beta<1$ and the m weighted cost functions $\Phi^{\gamma,1}, \ldots, \Phi^{\gamma,m}$ with the heavier weight $\gamma$ where $\gamma>1$ are defined depending on constant matrices $A_1, \ldots, A_m$ and constant vectors $b_1, \ldots, b_m$ that form the member functions $f_1, \ldots, f_m$.

8. The loyalty extraction machine of claim 7, wherein a cost c(j) contributed by a j-th training subset $\Omega_{tr}(i)$ is defined by $$c(j) = c(j; f_1, \ldots, f_m) = \sum_{x \in \Omega_{tr}(j)} \sum_{k \in S, k \neq j} \varphi_{jk}(x),$$

where $S=\{1, 2, \ldots, m\}$ is a set of memberships.

9. The loyalty extraction machine of claim 8, wherein weighted cost functions $\Phi^{\beta,j}(f_1, \ldots, f_m)$ are defined by $\Phi^{\beta,j}(f_1, \ldots, f_m) = c(1) + \ldots + c(j-1) + \beta \cdot c(j) + c(j+1) + \ldots + c(m)$; and the training process is configured to solve $$\min_{f_1, \ldots, f_m \in \Theta(q)} \Phi^{\beta,j}(f_1, \ldots, f_m)$$

in order to derive the member functions $f_1^{\beta,j}, \ldots, f_m^{\beta,j}$, $j=1, \ldots, m$, where $\Theta(q)$ is a set of all member functions.

10. The loyalty extraction machine of claim 9, wherein weighted cost functions $\Phi^{\gamma,j}(f_1, \ldots, f_m)$ are defined by $\Phi^{\gamma,j}(f_1, \ldots, f_m) = c(1) + \ldots + c(j-1) + \gamma \cdot c(j) + c(j+1) + \ldots + c(m)$; and the training process is configured to solve $$\min_{f_1, \ldots, f_m \in \Theta(q)} \Phi^{\gamma,j}(f_1, \ldots, f_m)$$

in order to derive the member functions $f_1^{\gamma,j}, \ldots, f_m^{\gamma,j}$, $j=1, \ldots, m$, where $\Theta(q)$ is a set of all member functions.

11. The loyalty extraction machine of claim 1, further comprising:

a bucket creation module connected to the classifier combination module and configured to partition the training set ($\Omega_{tr}$) into a disjoint union of subsets, which are called buckets and denoted by B(I), wherein the respective buckets (B(I)) have respective identities (I) associated with characteristics of the data; and a bucket merger module connected to the bucket creation module and configured to merge empty buckets and/or small buckets into large buckets.

12. The loyalty extraction machine of claim 11, wherein the bucket creation module is further configured to denote the cardinality of a subset of the bucket (B(I)) with membership (j) by $(n_{B(I)}(j))$ and the cardinality of a subset of the training set ($\Omega_{tr}$) with membership (j) by $(n_{tr}(j))$, and to perform merger such that the merged bucket (B) is sufficiently large that the condition $$\max_j \left\{\frac{n_B(j)}{n_{tr}(j)}\right\} \geq \delta$$

holds for a certain predetermined positive constant ($\delta$).

13. The loyalty extraction machine of claim 12, further comprising a membership assignment module connected to the bucket creation module and configured to assign respective memberships (j's) to the respective buckets (B(I)) if a ratio of the cardinality of sample data (x) with the membership (j) in a bucket (B(I)) to the cardinality of a subset ($\Omega_{tr}(j)$) of the training set ($\Omega_{tr}$) with the membership (j) is maximal among ratios of all memberships, the memberships (j's) referring to data categories of the training set ($\Omega_{tr}$); wherein a function for this assignment is represented as Y(B(I))=j.

14. The loyalty extraction machine of claim 13, wherein the membership of sample data (x) in the collection of data ($\Omega$) is also the membership of the bucket (B(I)) to which the sample data (x) is distributed.

15. The loyalty extraction machine of claim 1, wherein the loyalty type indicator is configured to denote each identity (I) as a vector with 2m coordinates, for $k=1, \ldots, m$, an identity (I) associated with a lighter weight ($\beta$) has a form of $$I(\beta, k) = \left( \underbrace{*, \ldots, *, \underbrace{k}_{\text{the } k\text{-th coordinate}}, *, \ldots, *}_{\text{the first } m \text{ coordinates}}, \underbrace{*, \ldots, *}_{\text{the second } m \text{ coordinates}} \right);$$

and an identity (I) associated with a heavier weight ($\gamma$) has a form of $$I(\gamma, k) = \left( \underbrace{*, \ldots, *,}_{\text{the first } m \text{ coordinates}} \underbrace{*, \ldots, *, \underbrace{k}_{\text{the } (m+k)\text{-th coordinate}}, *, \ldots, *}_{\text{the second } m \text{ coordinates}} \right).$$

16. The loyalty extraction machine of claim 15, wherein the loyalty type indicator is configured to determine that a sample data (x) has a membership (k) with strong loyalty if the vector function $V(x)=I(\beta,k)$ and an eclectic classifier $\tilde{y}(x)=k=Y(B(I(\beta,k)))$; or a sample data (x) has a membership (k) with weak loyalty if the sample data (x) is not strongly loyal to any membership, and the vector function $V(x)=I(\gamma,k)$, and an eclectic classifier $\tilde{y}(x)=k=Y(B(I(\gamma,k)))$; or an element has normal loyalty if it has neither strong loyalty nor weak loyalty.

17. The loyalty extraction machine of claim 1, wherein the complete loyalty extraction machine is expressed by a single mapping $$\zeta(x)=(\tilde{y}(x),\tau(x))\in S\times T, x\in\Omega,$$

wherein a first component $\tilde{y}(x)$ of the single mapping $\zeta(x)$ indicates the membership of the sample data (x), and a second component $\tau(x)$ of the single mapping $\zeta(x)$ indicates the loyalty type of the sample data (x);

wherein S is a set of memberships and T is a set of possible loyalty types.

\* \* \* \* \*